(12) United States Patent
Lombardi et al.

(10) Patent No.: US 10,069,953 B2
(45) Date of Patent: Sep. 4, 2018

(54) ELECTRONIC DEVICE WITH A TOUCH SENSOR AND METHOD FOR OPERATING THE SAME

(71) Applicant: Google Technology Holdings LLC., Mountain View, CA (US)

(72) Inventors: Michael J. Lombardi, Lake Zurich, IL (US); Amber M. Pierce, Evanston, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 15/639,505

(22) Filed: Jun. 30, 2017

(65) Prior Publication Data

US 2017/0302768 A1    Oct. 19, 2017

Related U.S. Application Data

(63) Continuation of application No. 15/217,254, filed on Jul. 22, 2016, now Pat. No. 9,727,154, which is a
(Continued)

(51) Int. Cl.
*H04M 1/02* (2006.01)
*G06F 3/16* (2006.01)
(Continued)

(52) U.S. Cl.
CPC .......... *H04M 1/026* (2013.01); *G06F 3/0346* (2013.01); *G06F 3/041* (2013.01); *G06F 3/165* (2013.01); *G06F 3/167* (2013.01); *G06K 9/00013* (2013.01); *H04M 1/57* (2013.01); *H04M 1/72569* (2013.01); *H04M 2203/6054* (2013.01);
(Continued)

(58) Field of Classification Search
CPC .......... G06F 2203/0381; G06F 3/0488; G06F 2203/04808; G06F 1/1624; G06F 3/041; H04N 1/00397; H04N 1/00403; H04N 21/4415; H04N 21/44222; H04M 1/6041;
(Continued)

(56) References Cited

U.S. PATENT DOCUMENTS 8,311,514 B2   11/2012   Bandyopadhyay et al.
8,446,382 B2   5/2013    Goto et al.
(Continued)

FOREIGN PATENT DOCUMENTS

WO        2010107827 A1    9/2010

OTHER PUBLICATIONS

Amazon, "Motorola Atrix 4G Android Phone (AT&T)," Amazon, Retrieved on Nov. 4, 2013, 7 pgs.
(Continued)

*Primary Examiner* — Kumar Patel
*Assistant Examiner* — Amy C Onyekaba
(74) *Attorney, Agent, or Firm* — Shumaker & Sieffert, P.A.

(57) ABSTRACT

An electronic device has a combination touch sensor (such as a fingerprint reader) and mechanical switch (actuated, for example, by a button press). The electronic device carries out various functions according to whether the touch sensor is being touched, the mechanical switch is being actuated, the electronic device is face up or face down, the state of the electronic device (awake or in sleep mode), and the function that the electronic device is currently carrying out.

20 Claims, 6 Drawing Sheets

Related U.S. Application Data continuation of application No. 14/071,498, filed on Nov. 4, 2013, now Pat. No. 9,411,446.

(51) Int. Cl.

| | |
|---|---|
| *G06K 9/00* | (2006.01) |
| *G06F 3/0346* | (2013.01) |
| *G06F 3/041* | (2006.01) |
| *H04M 1/725* | (2006.01) |
| *H04M 1/57* | (2006.01) |

(52) U.S. Cl.
CPC .... *H04M 2250/12* (2013.01); *H04M 2250/22* (2013.01); *H04M 2250/74* (2013.01)

(58) Field of Classification Search
CPC ............. H04M 2250/12; H04M 1/605; H04M 1/72569
See application file for complete search history.

(56) References Cited

U.S. PATENT DOCUMENTS

| | | | |
|---|---|---|---|
| 8,810,524 B1 | 8/2014 | Rosenberg et al. | |
| 9,411,446 B2 | 8/2016 | Lombardi et al. | |
| 2002/0021278 A1 | 2/2002 | Hinckley et al. | |
| 2009/0209293 A1* | 8/2009 | Louch ................. | H04M 1/6041 455/566 |
| 2010/0081473 A1* | 4/2010 | Chatterjee ............ | G06F 1/1632 455/559 |
| 2010/0159998 A1 | 6/2010 | Luke et al. | |
| 2011/0086626 A1* | 4/2011 | Kerr ..................... | H04M 1/605 455/418 |
| 2011/0312349 A1 | 12/2011 | Forutanpour et al. | |
| 2012/0258773 A1* | 10/2012 | Alvarez Rivera .... | G06F 1/1656 455/556.1 |
| 2013/0265284 A1 | 10/2013 | Yun et al. | |
| 2013/0288655 A1* | 10/2013 | Foruntanpour ..... | H04M 1/6008 455/418 |
| 2013/0300687 A1 | 11/2013 | Park | |
| 2014/0004907 A1* | 1/2014 | Kim .................. | H04M 1/72519 455/566 |
| 2014/0033071 A1* | 1/2014 | Gruber ............... | G06Q 10/1097 715/752 |
| 2014/0078086 A1 | 3/2014 | Bledsoe et al. | |
| 2014/0316777 A1* | 10/2014 | Cha ......................... | G06F 3/167 704/231 |
| 2015/0039369 A1* | 2/2015 | Chen ....................... | H04B 7/26 705/7.19 |
| 2015/0126246 A1 | 5/2015 | Lombardi et al. | |
| 2016/0042166 A1* | 2/2016 | Kang ..................... | G06F 21/32 726/7 |
| 2017/0010705 A1 | 1/2017 | Lombardi et al. | |

OTHER PUBLICATIONS

Daniel P, "HTC One Max phablet poses for a family portrait, flashes a fingerprint sensor," Phone Arena.com, 8 pgs., Aug. 19, 2013.
Joanna Stern, "iPhone 5S and 5C: Everything You Need to Know About the Next iPhone," ABC News, 4 pgs. Aug. 20, 2013.
Prosecution History from U.S. Appl. No. 14/071,498, from Jan. 27, 2014 through Apr. 14, 2016 54 pgs.
Prosecution History from U.S. Appl. No. 15/217,254, from Jul. 27, 2016 through Mar. 29, 2013 41 pgs.

* cited by examiner

FIG. 2

| | PROX UNCOVERED DISPLAY OFF | PROX UNCOVERED DISPLAY ON | | | PROX COVERED (DEVICE FACE DOWN) | | | |
|---|---|---|---|---|---|---|---|---|
| | ALL STATES | NO MUSIC PLAYING | MUSIC PLAYING | DEVICE IDLE | MAKE PLAYING | INCOMING CALL | SPEAKER PHONE |
| TOUCH FPR | WAKE, AUTHENTICATE | N/A | N/A | VOICE COMMAND | N/A | ANNOUNCE CALLER | N/A |
| HOLD FPR | WAKE, AUTHENTICATE | N/A | N/A | VOICE COMMAND | N/A | N/A | N/A |
| FPR SWIPE UP | N/A | VOLUME UP | VOLUME UP | N/A | VOLUME UP | N/A | VOLUME UP |
| FPR SWIPE DOWN | N/A | VOLUME DOWN | VOLUME DOWN | N/A | VOLUME DOWN | N/A | VOLUME DOWN |
| FPR SWIPE TO FIRST SIDE | N/A | NO ACTION | PREVIOUS TRACK | N/A | NEXT TRACK | N/A | N/A |
| FPR SWIPE TO SECOND SIDE | N/A | NO ACTION | NEXT TRACK | N/A | PREVIOUS TRACK | N/A | N/A |
| BUTTON PRESS | N/A | LOCK SCREEN | LOCK SCREEN | PLAY PAUSED MUSIC | PAUSE | SPEAKER PHONE | END CALL |
| BUTTON SHORT HOLD | N/A | POWER MENU | POWER MENU | CHIRP, SHUFFLE ALL | N/A | IGNORE CALL | N/A |
| BUTTON LONG HOLD | DEVICE RESET | DEVICE RESET | DEVICE RESET | DEVICE RESET | DEVICE RESET | DEVICE RESET | DEVICE RESET |

*FIG. 3A*

- A PERVASIVE ACTION ACROSS ANY DEVICE STATE - HOLD BUTTON FOR OVER 10 SECONDS TO REST DEVICE
- A QUICK AUTHENTICATED ACTION THAT DOES NOT REQUIRE THE DISPLAY - TOUCHING THE TOUCH SENSOR OR HOLDING A BUTTON PRESS ALLOWS THE USER TO PERFORM A VOICE COMMAND
- SITUATIONAL STATES MAY ENABLE ALTERNATE USES FOR THE INTEGRATED SENSOR
- A BUTTON PRESS CAN BE USED TO PLAY/PAUSE AN AUDIO STREAM AND/OR ANSWER/END A CALL AND THEN LAUNCH AN APPLICATION SUCH AS MUSIC
- HOLDING THE BUTTON FOR A FEW SECONDS MAY PRODUCE AN AUDIBLE CHIRP (SO THAT USER KNOWS TO RELEASE)
- THE DEVICE FACE DOWN AND IDLE ENABLES A VARIETY OF USEFUL FUNCTIONS BEYOND WHAT THE INTEGRATED SENSOR IS CAPABLE OF DOING WITH THE DEVICE FACE UP AND DISPLAY EXPOSED TO THE USER

ELECTRONIC DEVICE WITH A TOUCH SENSOR AND METHOD FOR OPERATING THE SAME

This application is a Continuation of U.S. application Ser. No. 15/217,254, filed Jul. 22, 2016, which is a Continuation of U.S. application Ser. No. 14/071,498, filed Nov. 4, 2013 (now U.S. Pat. No. 9,411,446, issued on Aug. 9, 2016), the entire content of each of which is hereby incorporated by reference.

TECHNICAL FIELD

The present disclosure relates to touch control of electronic devices and, more particularly, operating such devices based on inputs from switches and touch sensors.

BACKGROUND

Touch sensors have been used in electronic devices for many years, but mostly in conjunction with a display screen, often called a "touch screen." The use of touch sensors in the body of the device is not as common and is typically limited to determining whether the device is being touched. The recent addition of biometric sensors, especially fingerprint readers, will likely spur the use of touch sensors in general, and create additional opportunities to add functionality to the these devices.

DRAWINGS

While the appended claims set forth the features of the present techniques with particularity, these techniques may be best understood from the following detailed description taken in conjunction with the accompanying drawings of which:

DESCRIPTION

Various embodiments of the disclosure include an electronic device (also referred to as a "device") that has a touch sensor that is combined with a mechanical switch. As used herein, "integrated switch" refers to the combination of the touch sensor and the mechanical switch, while each of the individual components will be referred to as the "touch sensor" and the "mechanical switch." The integrated switch is located on the rear side of an electronic device (the front side having a touchscreen display). This combination of a touch sensor and a mechanical switch offers a variety of quick-access actions to users without the need for additional buttons or the need for the user to interact with anything else on the device other than the integrated switch. To activate the touch sensor, a user need only touch the integrated switch. To actuate the mechanical switch, the user needs to press a button (which overlaps the touch sensor) on the rear of the device. As the touch sensor and the mechanical switch are integrated, pressing the button may activate the touch sensor as well as actuate the mechanical switch). In contrast, touching the button without pressing it may activate the touch sensor but not actuate the mechanical switch. If the touch sensor is implemented as a fingerprint reader ("FPR"), then the quick-access actions can be performed in conjunction with authenticating the user.

According to various embodiments of the disclosure, the electronic device carries out a different set of functions depending on whether the device is face down or face up, on the nature of the user's touch, on whether the button is being pressed, on what state the device is in, and on what function the device is currently performing. To determine whether the device is face up or face down, the device relies on its proximity sensor (blocked means face down on a surface) and, optionally, on its accelerometer (moving may indicate the device is being held, while face down and stationary may indicate the device is face down on a surface).

In one embodiment, the device reacts to a lateral swipe on the touch sensor in opposite ways, depending on whether the device is face up or face down. For example, if the device is face up, a swipe is towards a first side of the device (e.g., a "left swipe") will have the same effect as a swipe towards a second, opposite side of the device when the device is face down. In contrast, the device reacts the same way to a swipe toward the top end of the device ("up swipe") and to a swipe toward the bottom end ("down swipe") regardless of whether the device is face up or face down. In those embodiments where the touch sensor is an FPR and the device determines that it is face down, the user, by touching the FPR, can perform an authenticated action (e.g., speaking a voice command) without picking up the device.

In one embodiment, the device does not register a user's touch on the touch sensor until the device detects that the user has ceased touching the touch sensor. Furthermore, the device can determine the length of time between a touch on the touch sensor and the button being pressed and change its behavior in response to the determined length of time.

The electronic device can react in different ways depending on the nature of the touch on the touch sensor and on the orientation of the device. The following are representative examples: When the device is face up: (1) If the device is idle, touching the sensor instantly wakes the device and, if the sensor is implemented as an FPR, seamlessly authenticates the user. (2) When the display is on, pressing the button locks the display. (3) When the display is turned off via button press, the user must cease touching the sensor before the device can detect a new touch. (4) When the device is on and playing music, a user may swipe to the first side of the device on the touch sensor, in which case the device reacts by selecting the previous track, or to the second side of the device, in which case the device reacts by selecting the next track. Swiping up or down causes the device to increase or decrease its volume.

When the display is off and the device is face down on a surface, thus blocking the proximity sensor: (1) Touching the touch sensor puts the device into a voice command mode which may be authenticated if the touch sensor is an FPR. (2) Pressing the button causes the device to play or to pause an existing audio stream. (3) Holding the button down for a short duration causes the device to launch a predefined application such as a music player, or perform some function within the application, such as shuffling music on a music player. (4) With music playing, a swipe to the first side or to the right on the touch sensor causes the device to react in the opposite manner as when the display is uncovered, i.e., the device selects the next track on a swipe toward the first side or the previous track on a swipe toward the second side.

Figure 1A:
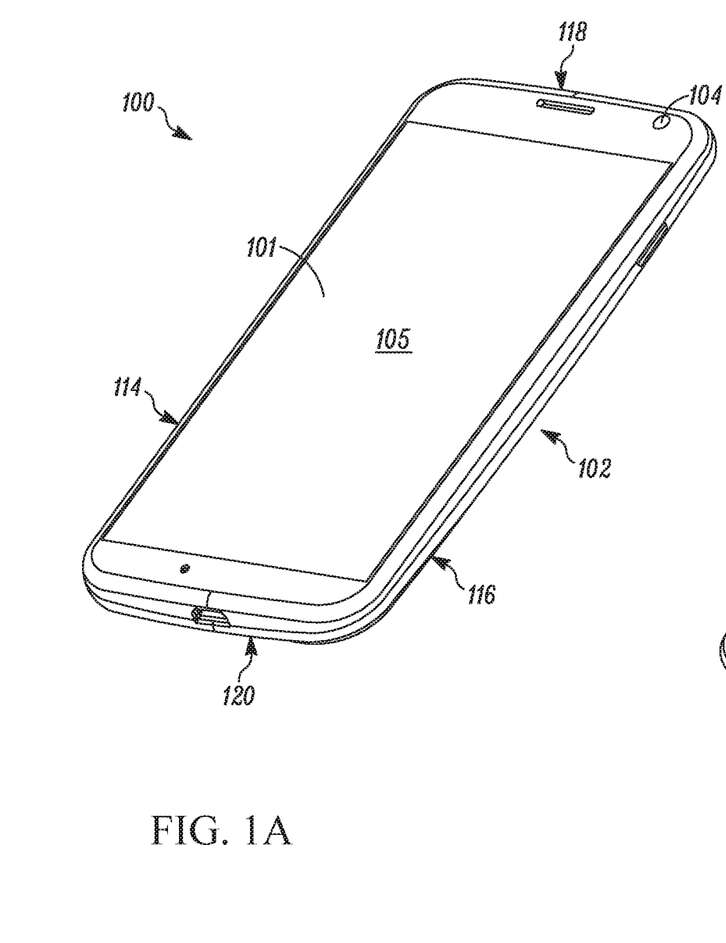
FIGS. 1A and 1B (collectively, "FIG. 1") depict an electronic device according to an embodiment.
Figure 1B:
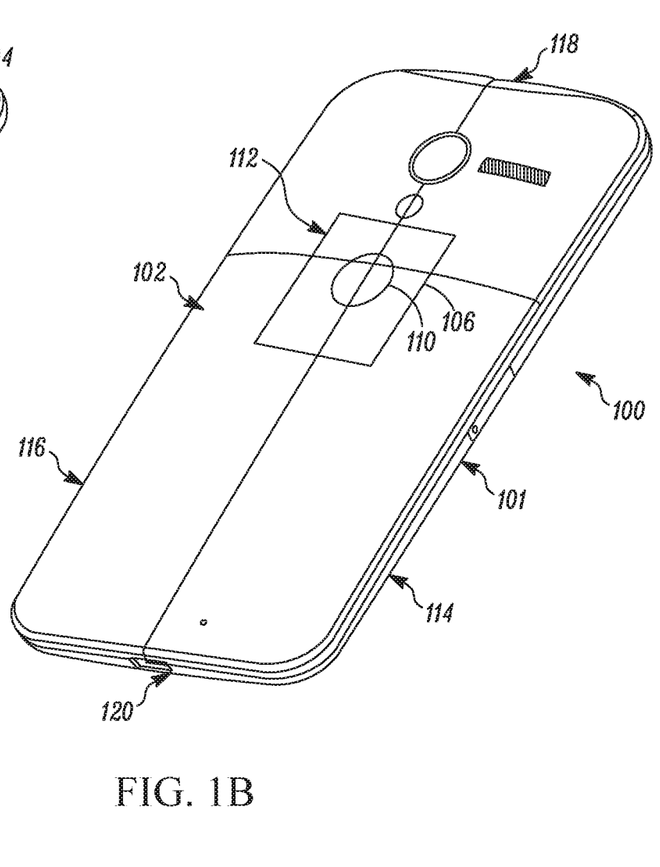

Turning to FIG. 1, an embodiment of the electronic device 100 has a front side 101, which includes a touch screen display 105 and proximity sensor 104. The electronic device 100 also has a rear side 102. Located on the rear side 102 is an integrated switch 112 having a touch sensor 106 (e.g., an FPR), and a mechanical switch (shown in FIG. 2 as 110A) located behind the touch sensor 106. Also located on the rear side 102 is a button 110 that overlaps the touch sensor 106. The button 110 is coupled to the mechanical switch, and it is to be understood that when the button 110 is pressed, the mechanical switch is triggered. Possible implementations of the electronic device 100 include a cell phone, portable music player, and game console.

Referring still to FIG. 1, the electronic device 100 has a top end 118 and a bottom end 120. The electronic device 100 also has a first side 114 and a second side 116, each of which is disposed laterally with respect to an axis of the electronic device 100 that passes through the top end 118 and the bottom end 120. When the electronic device 100 is in oriented face up, the first side 114 is the left side of the electronic device 100, and the second side 116 is the right side of the electronic device 100. When the electronic device 100 is face down, the second side 116 is the left side of the electronic device 100, and the first side 114 is the right side of the electronic device 100.

Figure 2:
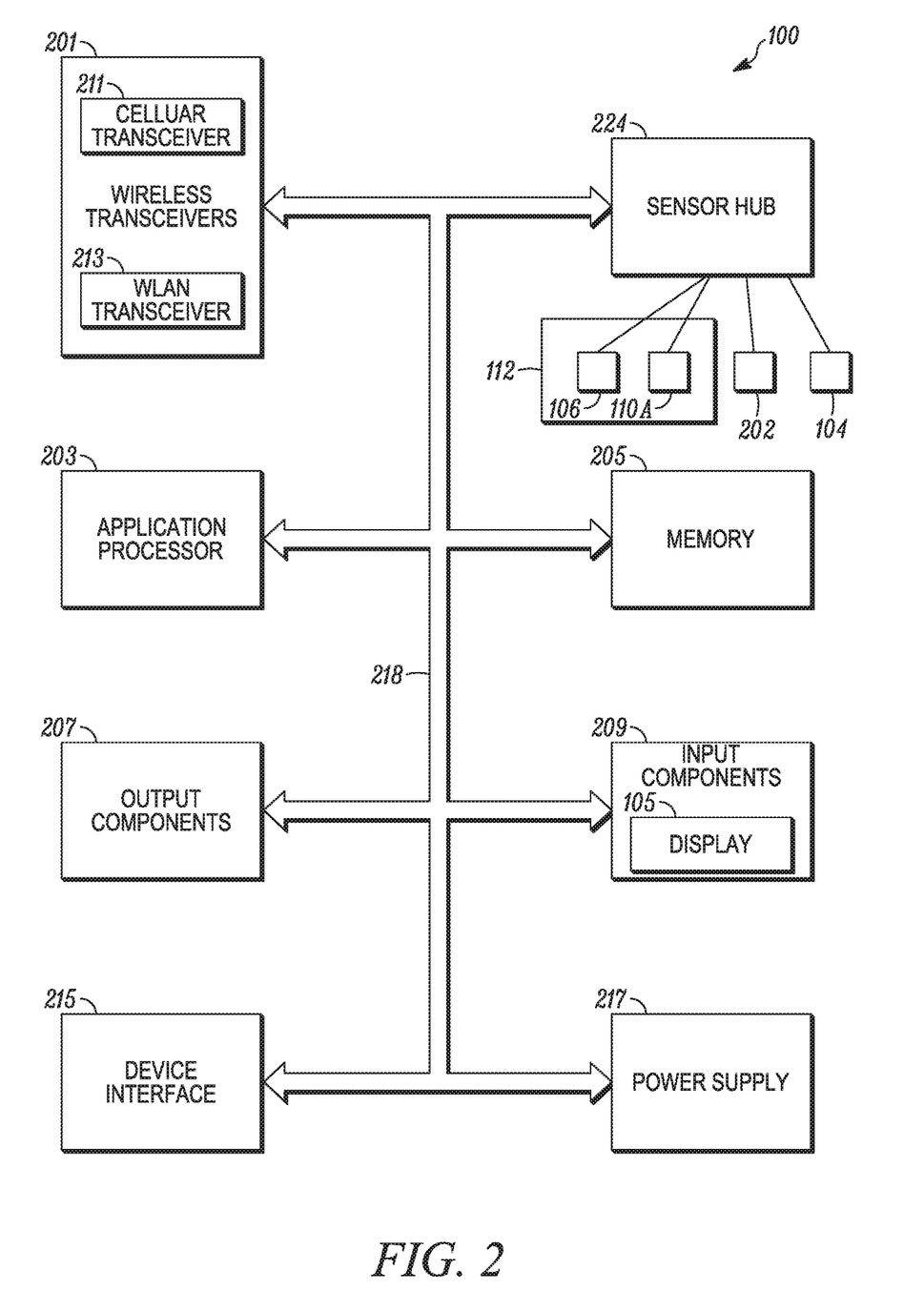
FIG. 2 shows example components of the electronic device of FIG. 1.

Turning to FIG. 2, the electronic device 100 (FIG. 1) further includes one or more wireless transceivers 201, an application processor 203, a memory 205, one or more output components 207, and one or more input components 209 (including the display 105). The touch sensor 106 and the switch 110A of the integrated switch 112 are electrically coupled to a sensor hub 224. The proximity sensor 104 and an accelerometer 202 are also electrically coupled to the sensor hub 224. The sensor hub 224 may be implemented as a low-power processor (i.e., a processor that consumes less power than the application processor 203), which can carry out methods described herein. The term "processor" may refer to either the sensor hub 224 or the application processor 203. Other components of the electronic device 100 include a device interface 215 and a power supply 217. The components depicted in FIG. 2 are coupled directly or indirectly with one another by one or more communication links 218 (e.g., an internal communication bus). The wireless transceivers 201 include a cellular transceiver 211 and a wireless local area network ("WLAN") transceiver 213.

In an embodiment of the disclosure, the sensor hub 224, in addition to controlling the various sensors, also serves to control operation of the touch screen display 105 (and the functionality that supports it) when the electronic device 100 is in a sleep mode. In contrast, which the electronic device 100 is awake or on, the touchscreen display 105 (and the functionality that supports it) is under the control of the application processor 203.

Possible implementations of the application processor 203 include a microprocessor, microcomputer, and application-specific integrated circuit. The application processor 203 executes instructions retrieved from the memory 205.

It is to be understood that FIG. 2 is provided for illustrative purposes only, and is not intended to be a complete schematic diagram of the various components required for an electronic device.

Figure 3A:
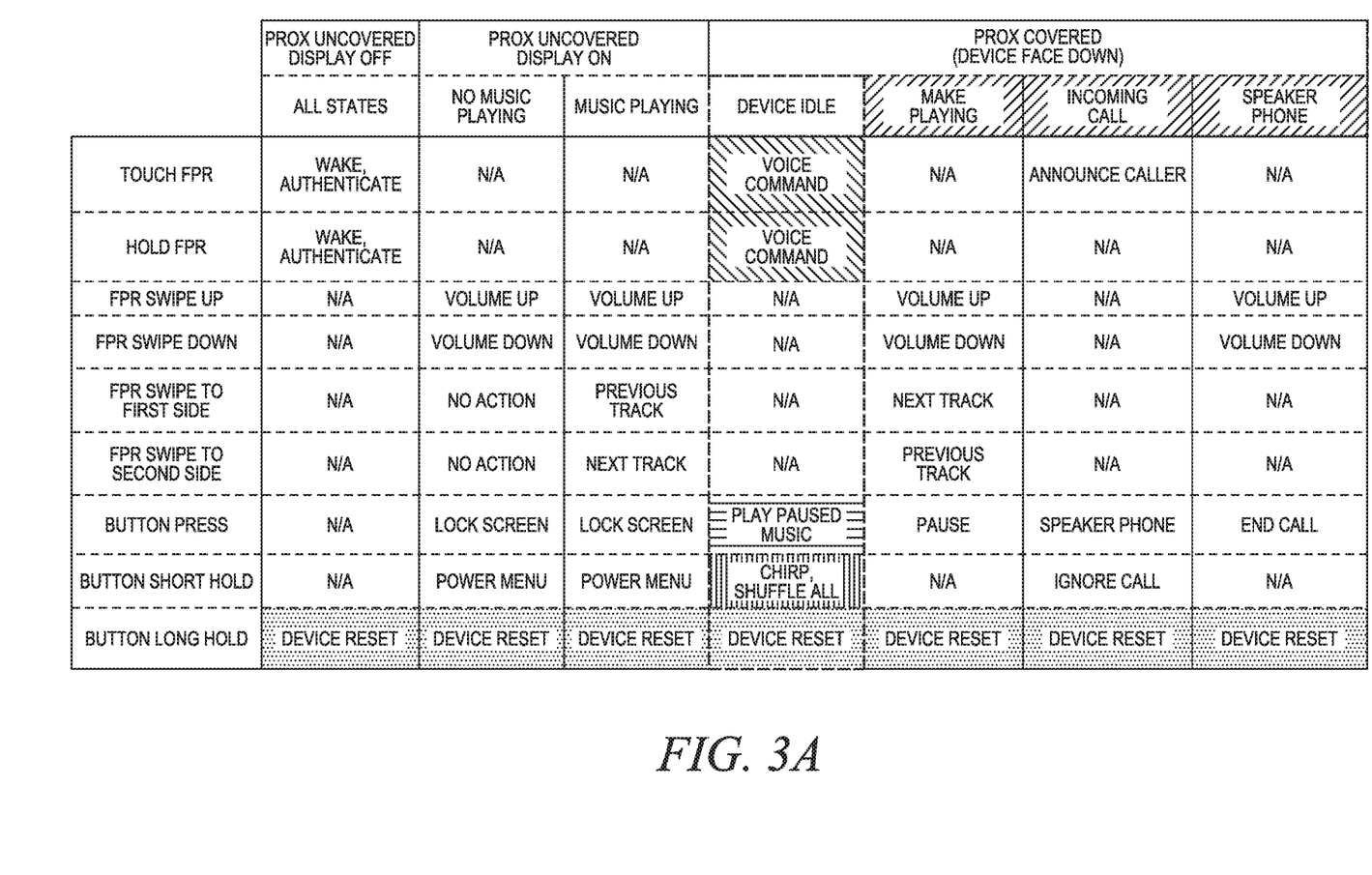
FIGS. 3A and 3B (collectively, "FIG. 3") depict a table describing of how the device of FIG. 1 reacts to various combinations of touch sensor inputs, button presses, and contexts according to an embodiment.
Figure 3B:
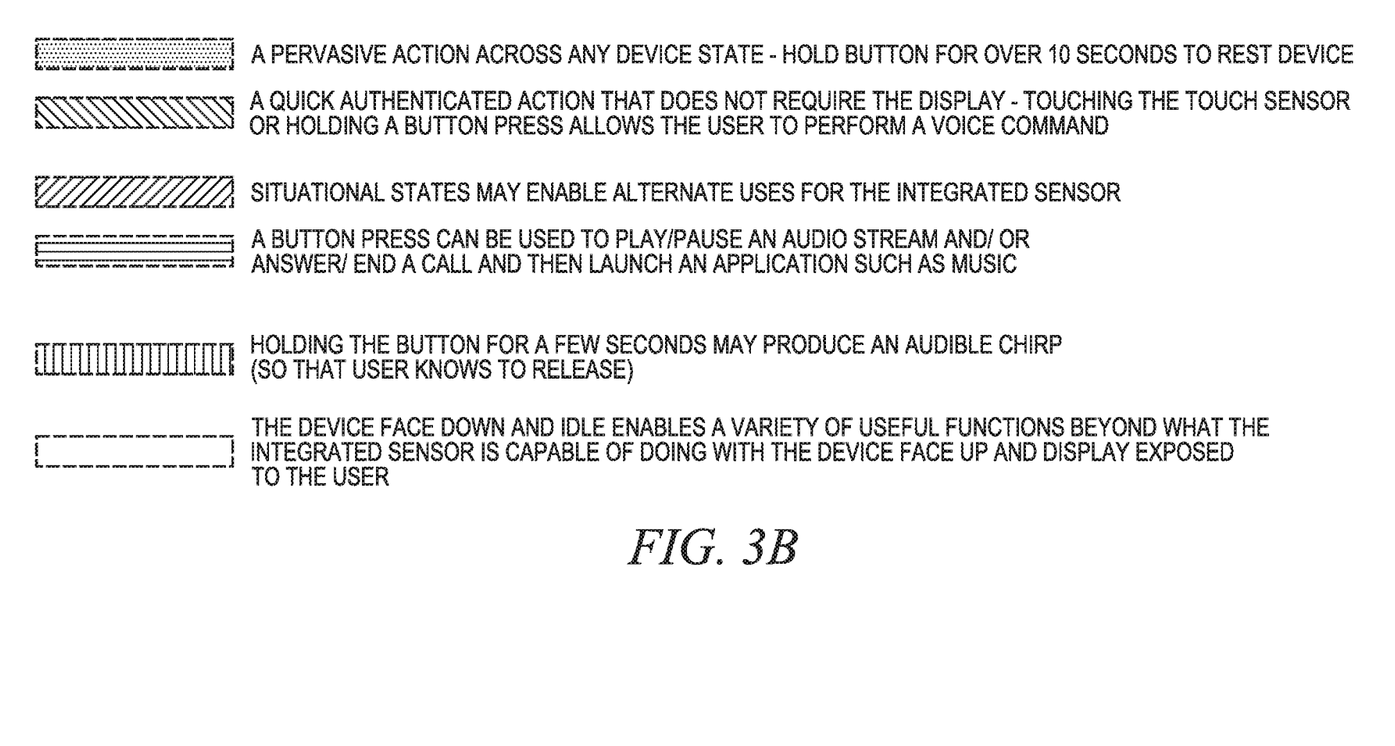

In FIG. 3, the table of FIG. 3A shows how the device 100 reacts to different combinations of user touches on the touch sensor 106, presses on the button 110, orientation of the device 100, state of the device 100, and function being performed by the electronic device 100 according to an embodiment of the disclosure. FIG. 3B describes some of the characteristics of the different combinations shown in the table, and maps those characteristics to entries of the table of FIG. 3A according to the patterns overlaid on the table.

To determine whether the device is face down on a surface or face up, the device 100 relies on input from the proximity sensor 104 and, in some embodiments, input from the accelerometer 202. The device interprets these inputs as follows: (1) The proximity sensor 104 being covered indicates that the device 100 is face down on a surface. (2) As an extra check (or as an alternative to the use of the proximity sensor 104), if the accelerometer 202 indicates that the device 100 is moving or is face up, the device 100 interprets this to mean that the device 100 is being held by a user, and therefore that the device 100 is not face down on a surface. (3) If the accelerometer indicates that the device 100 is face down and stationary, the device 100 interprets this to mean that the device 100 is face down on a surface.

Figure 4A:
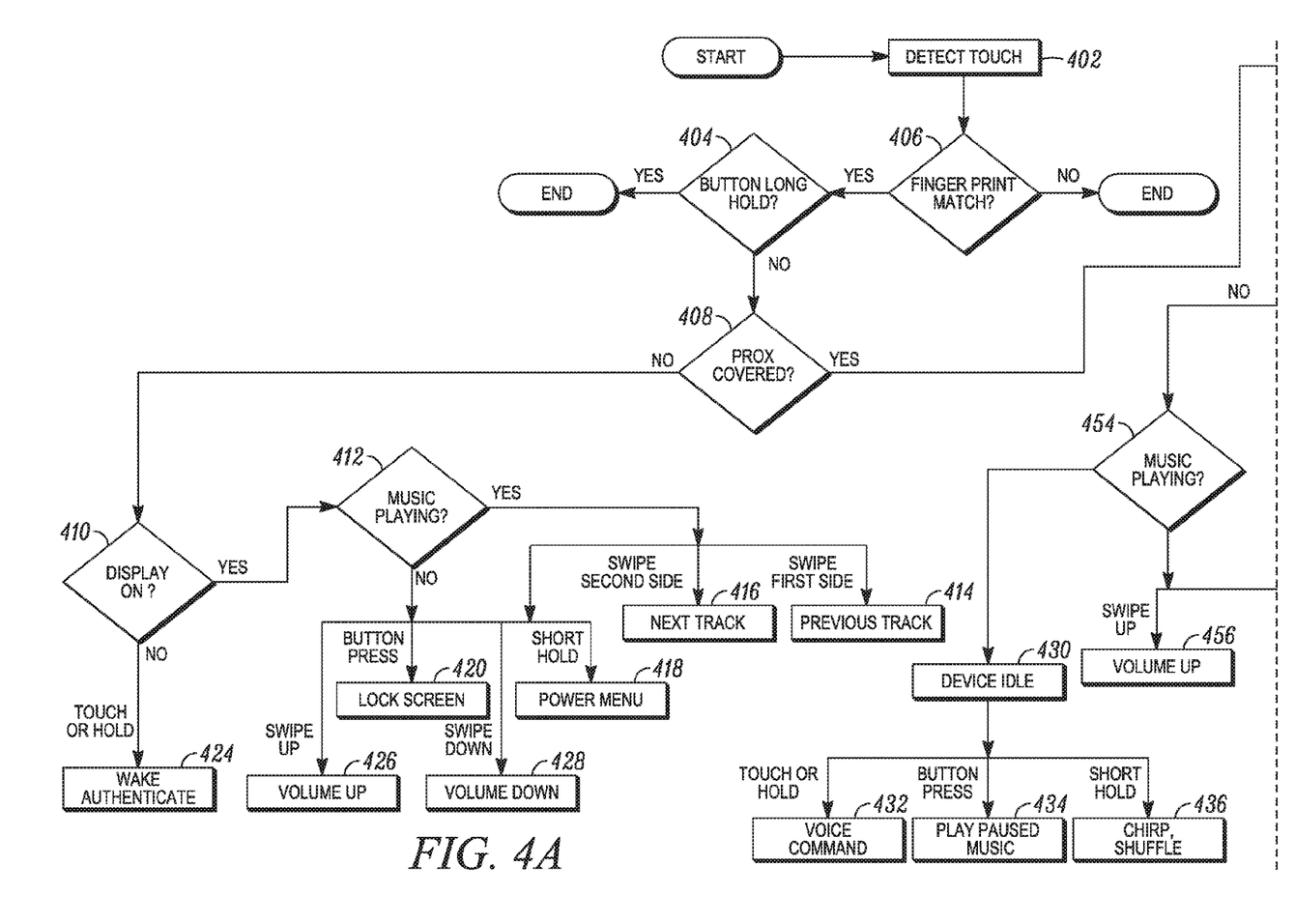
FIGS. 4A and 4B (collectively, "FIG. 4") show a flowchart representing the various ways in which the device of FIG. 1 reacts to different inputs and contexts in an embodiment.
Figure 4B:
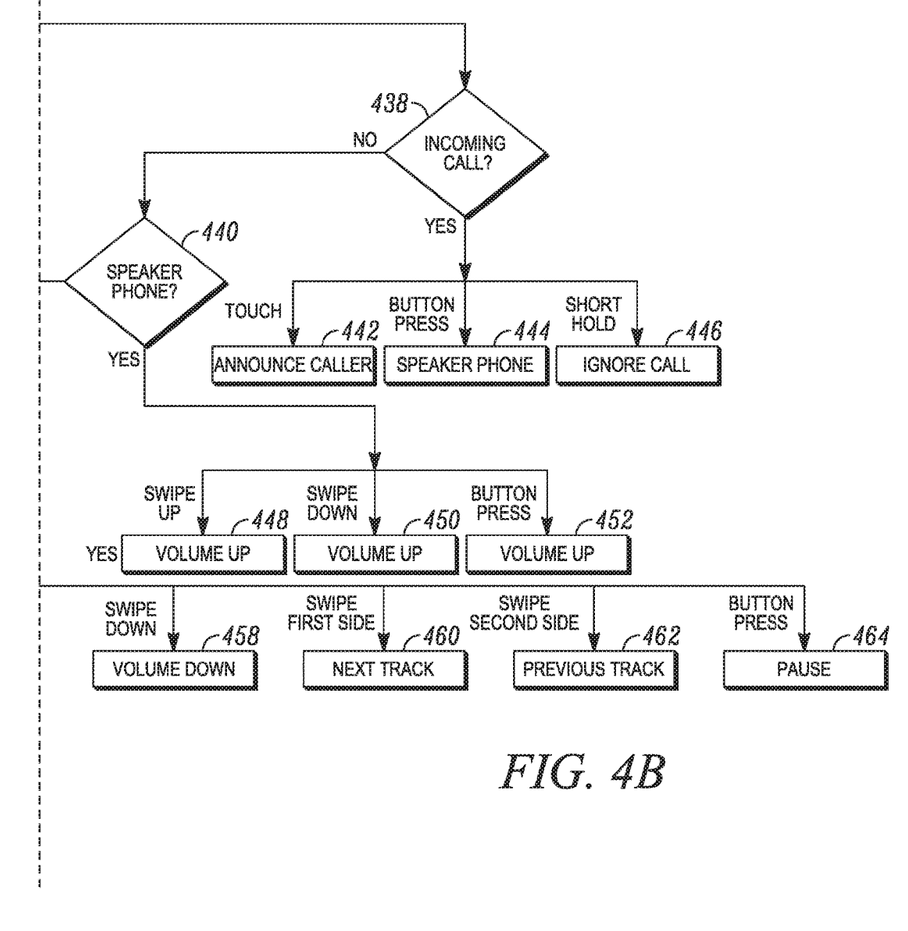

FIG. 4 shows a flowchart representing the various ways in which the device 100 may react to different inputs and contexts in an embodiment of the disclosure. It does not necessarily mean that the device 100 undertakes a sequential decision-making process or executes steps in any particular order, however.

The user touches the touch sensor 106, which is an FPR in this example, with a finger, and the sensor hub 224 detects the touch (block 402). The sensor hub 224 determines whether the pattern of the user's fingerprint matches that of an authorized user (block 406). If it does not, then the device 100 does nothing. If the pattern matches (block 404) and the user presses the button 110, holding it for longer than a threshold period of time, the device 100 powers off. If the button press does not exceed the threshold period of time, the process continues to block 408. If the sensor hub 224 determines, based on signals from the proximity sensor 104, that the proximity sensor 104 is not covered (i.e., indicating that the device 100 is face up), the process continues to block 410. If the sensor hub 224 determines that the display 105 is off, the sensor hub 224 signals the application processor 203, which responds by waking up. The application processor 203 and authenticates the user based on fingerprint signals it receives from the touch sensor 106 (block 424).

If, at block 410, the display 105 is on (i.e., the device 100 is awake), the process moves to block 412. If, at block 412, the music player of the device 100 is not playing, then the device 100 reacts as follows: If, based on signals from the touch sensor 106, the device 100 determines that there is a swipe up or swipe down on the touch sensor 106, the device 100 increases (block 426) or decreases (block 428) its volume. If, based on signals from the switch 110A, the device 100 determines that the button 110 is pressed and released, the device 100 locks the touchscreen display 105 (block 420). If, based signals from the switch 110A, the device 100 determines that the button 110 is being pressed and held for a time period less than the time threshold for powering off the device ("short hold"), the device 100 displays a power menu on the touchscreen display 105 (block 418).

Continuing with flowchart of FIG. 4, if the music player is playing (block 412), the device 100 reacts to a swipe up, swipe down, button press, and short hold as previously discussed (blocks 426, 420, 428, and 418). If, based on signals from the touch sensor 106, the device 100 determines that there has been a lateral swipe (i.e., toward the first side 114 or the second side 116), then the device 100 reacts by selecting the previous track (block 414) or to the next track (block 416), respectively.

The detection and determination of the different types of inputs—touch, button hold, button press, short hold, swipe up, swipe down, swipe toward the first side 114, and swipe toward the second side 116—have been described above and need not be repeated for the remaining description of FIG. 4.

If, at block 408, the sensor hub 224 determines, based on signals from the proximity sensor 104, that the proximity sensor 104 is covered (i.e., indicating that the device 100 is face down), the process continues to block 438. If, at block 438, the device 100 determines that there is an incoming call, the device 100 reacts to the different inputs as follows: (1) A touch on the touch sensor 106 alone causes the device 100 to react by announcing the caller (e.g., the caller's name as indicated by caller ID and the device's stored contact list) (block 442). (2) The button 110 being pressed and released causes the device 100 to react by putting the incoming call on speakerphone (block 444). (3) A short hold on the button 110 causes the device 100 to react by ignoring the call (block 446).

If, at block 438, the device 100 determines that there is not an incoming call, the process moves to block 440. If the device 100 is in speakerphone mode, then the device 100 reacts to the different inputs as follows. (1) A swipe up causes the device 100 to react by increasing its volume (block 448). (2) A swipe down causes the device 100 to react by decreasing its volume (block 450). (3) A button press and release causes the device 100 to end the call (block 452).

If the device 100 is not in speakerphone mode, the process moves to block 454. If, at block 454, the music player of the device 100 is playing music, it reacts to inputs as follows: (1) A swipe up causes the device 100 to react by increasing its volume (block 456). (2) A swipe down causes the device 100 to react by decreasing its volume (block 458). (3) A swipe toward the first side 114 causes the device 100 to react by moving to the next track (block 460). (4) A swipe toward the second side 116 causes the device 100 to react by moving to the previous track (block 462). (5) A button press causes the device 100 to react by pausing the music (block 464).

If, at block 454, the music player of the device 100 is not playing music and the device 100 is idle (block 430), the device 100 reacts to inputs as follows: (1) A touch or a button press and hold causes the device 100 to listen for a voice command (block 432). (2) A button press and release causes the device 100 to react by playing the paused music (block 434). (3) A short hold causes the device 100 to react by chirping and shuffling the music (block 436).

It can be seen from the foregoing that an electronic device with a touch sensor and method for operating the same has been provided. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

What is claimed is:

1. A method comprising:
receiving, by one or more processors, a first signal indicating whether or not a proximity sensor of an electronic device is covered;
receiving, by the one or more processors, a second signal indicating a touch of a user at a fingerprint reader of the electronic device;
determining, by the one or more processors, that the touch of the user corresponds to a fingerprint of an authorized user;
after receiving the first signal and the second signal, determining, by the one or more processors, a mode in which the electronic device is operating; and
after determining the mode in which the electronic device is operating, performing, by the one or more processors, based on the first signal indicating whether or not the proximity sensor is covered, and further based on the mode, at least one action while the electronic device operates in the mode.

2. The method of claim 1, wherein performing the at least one action occurs further responsive to determining, based on the first signal, that that the proximity sensor is uncovered, and determining, based on the second signal, a swipe towards one end of the electronic device.

3. The method of claim 1, wherein performing the at least one action occurs further responsive to determining, based on the first signal, that the proximity sensor is covered, and determining, based on the second signal, a swipe towards one end of the electronic device.

4. The method of claim 1, further comprising:
receiving a third signal from a mechanical switch coupled to a button, wherein the button overlaps the fingerprint reader; and
performing the at least one action further based on the third signal from the mechanical switch.

5. The method of claim 1, further comprising:
receiving a third signal from an accelerometer indicating whether the electronic device is moving or stationary; and
performing the at least one action further based on the third signal indicating whether the electronic device is moving or stationary.

6. The method of claim 1, further comprising:
receiving a third signal from an accelerometer indicating whether the electronic device is face up or face down; and
performing the at least one action further based on the third signal indicating whether the electronic device is face up or face down.

7. The method of claim 1, where the proximity sensor is located on a first side of the electronic device, and wherein the fingerprint reader is located on a second side of the electronic device that is opposite from the first side.

8. The method of claim 1, wherein performing the at least one action comprises:
receiving an indication of a voice command; and
outputting a response to the voice command.

9. The method of claim 1, wherein the mode in which the electronic device is operating is selected from a group consisting of a media playing mode, an idle mode, an incoming call mode, and a speakerphone mode.

10. The method of claim 1,
wherein determining the mode in which the electronic device is operating comprises determining that the electronic device is receiving an incoming call, and
wherein performing the at least one action comprises outputting information identifying a caller of the incoming call.

11. The method of claim 1,
wherein determining the mode in which the electronic device is operating comprises determining that the electronic device is receiving an incoming call, and
wherein performing the at least one action comprises ignoring the incoming call.

12. The method of claim 1,
wherein determining the mode in which the electronic device is operating comprises determining that the electronic device is in a speakerphone mode, and
wherein performing the at least one action comprises terminating an ongoing phone call at the electronic device.

13. The method of claim 1,
wherein determining the mode in which the electronic device is operating comprises determining that the electronic device is in a speakerphone mode, and
wherein performing the at least one action comprises changing a volume of a speaker of the electronic device.

14. An electronic device comprising:
a proximity sensor;
a fingerprint reader; and
at least one processor configured to:
   receive a first signal indicating whether or not the proximity sensor is covered;
   receive a second signal indicating a touch of a user at the fingerprint reader;
   determine that the touch of the user corresponds to a fingerprint of an authorized user;
   after receiving the first signal and the second signal, determine a mode in which the electronic device is operating; and
   after determining the mode in which the electronic device is operating, perform, based on the first signal indicating whether or not the proximity sensor is covered, and further based on the mode, at least one action while the electronic device operates in the mode.

15. The electronic device of claim 14, wherein:
the proximity sensor is located on a first side of the electronic device,
the fingerprint reader is located on a second side of the electronic device,
the first side of the electronic device is opposite from the second side.

16. The electronic device of claim 14, further comprising an accelerometer, wherein the at least one processor is further configured to:
   receive a third signal from the accelerometer indicating whether the electronic device is moving or stationary; and
   perform the at least one action further based on the third signal indicating whether the electronic device is moving or stationary.

17. The electronic device of claim 14, further comprising an accelerometer, wherein the at least one processor is further configured to:
   receive a third signal from the accelerometer indicating whether the electronic device is face up or face down; and
   perform the at least one action further based on the third signal indicating whether the electronic device is face up or face down.

18. The electronic device of claim 14, further comprising a mechanical switch coupled to a button,
   wherein the button overlaps the fingerprint sensor, and
   wherein the at least one processor is further configured to perform the at least one action further based on whether the mechanical switch is being actuated.

19. The electronic device of claim 14, wherein the at least one processor is configured to perform the at least one action at least by being configured to:
   receive an indication of a voice command; and
   output a response to the voice command.

20. The electronic device of claim 14, wherein the mode in which the electronic device is operating is selected from a group consisting of a media playing mode, an idle mode, an incoming call mode, and a speakerphone mode.

\* \* \* \* \*